United States Patent
Rehani et al.

(10) Patent No.: US 9,667,513 B1
(45) Date of Patent: May 30, 2017

(54) REAL-TIME AUTONOMOUS ORGANIZATION

(71) Applicant: DW Associates, LLC, Austin, TX (US)

(72) Inventors: Manu Rehani, Portland, OR (US); Warren L. Wolf, Austin, TX (US)

(73) Assignee: DW ASSOCIATES, LLC, Austin, TX (US)

( * ) Notice: Subject to any disclaimer, the term of this patent is extended or adjusted under 35 U.S.C. 154(b) by 658 days.

(21) Appl. No.: 13/749,232

(22) Filed: Jan. 24, 2013

Related U.S. Application Data

(60) Provisional application No. 61/590,202, filed on Jan. 24, 2012.

(51) Int. Cl.
| | |
|---|---|
| H04L 12/24 | (2006.01) |
| H04L 12/26 | (2006.01) |
| H04M 1/725 | (2006.01) |
| H04M 3/53 | (2006.01) |

(52) U.S. Cl.
CPC .......... H04L 43/045 (2013.01); H04L 41/509 (2013.01); H04M 1/72547 (2013.01); H04M 3/5307 (2013.01)

(58) Field of Classification Search
CPC ...... G06Q 30/00; G06Q 90/00; H04L 41/509; H04M 1/72547; H04M 3/5307
USPC .................................. 709/203, 219, 222, 224
See application file for complete search history.

(56) References Cited

U.S. PATENT DOCUMENTS

| | | | | |
|---|---|---|---|---|
| 5,893,126 | A * | 4/1999 | Drews | G06F 3/0481 715/203 |
| 6,453,336 | B1 * | 9/2002 | Beyda | H04L 29/06 709/204 |
| 7,120,880 | B1 * | 10/2006 | Dryer | G06Q 30/02 715/831 |
| 7,185,054 | B1 * | 2/2007 | Ludwig | G06F 3/0482 348/E7.081 |
| 7,660,815 | B1 * | 2/2010 | Scofield | G06F 17/30702 707/999.102 |
| 7,664,057 | B1 * | 2/2010 | Wu | H04N 21/234318 370/260 |
| 7,797,421 | B1 * | 9/2010 | Scofield et al. | 709/224 |
| 7,966,395 | B1 * | 6/2011 | Pope et al. | 709/224 |
| 2002/0059376 | A1 | 5/2002 | Schwartz | |
| 2002/0099730 | A1 | 7/2002 | Brown et al. | |
| 2002/0106622 | A1 | 8/2002 | Osborne et al. | |

(Continued)

FOREIGN PATENT DOCUMENTS

| | | |
|---|---|---|
| JP | 2002149675 | 5/2002 |
| JP | 2004102428 | 4/2004 |

(Continued)

OTHER PUBLICATIONS

Employee Engagement What's Your Engagement Ratio? Gallup Consulting 2008.

(Continued)

*Primary Examiner* — Arvin Eskandarnia
(74) *Attorney, Agent, or Firm* — Marger Johnson

(57) ABSTRACT

A system can receive content. The content can be analyzed to determine the invested interest of an object in a network, and to determine the strength of a relationship in the network, the network pertaining to a particular setting. The network can then be graphed, and the information produced can be output for later use.

15 Claims, 7 Drawing Sheets

(56) References Cited

U.S. PATENT DOCUMENTS

| | | |
|---|---|---|
| 2002/0143573 A1 | 10/2002 | Bryce et al. |
| 2003/0027121 A1 | 2/2003 | Grudnitski et al. |
| 2003/0028564 A1 | 2/2003 | Sanfilippo |
| 2003/0093322 A1 | 5/2003 | Sciuk |
| 2003/0144868 A1 | 7/2003 | MacIntyre et al. |
| 2003/0167266 A1 | 9/2003 | Saldanha et al. |
| 2003/0182310 A1 | 9/2003 | Charnock et al. |
| 2003/0221100 A1* | 11/2003 | Russ .................. H04N 21/8586 713/153 |
| 2004/0030556 A1 | 2/2004 | Bennett |
| 2004/0053203 A1 | 3/2004 | Walters et al. |
| 2004/0117234 A1 | 6/2004 | Lindsay-Scott et al. |
| 2005/0055209 A1 | 3/2005 | Epstein |
| 2005/0165600 A1 | 7/2005 | Kasravi et al. |
| 2005/0192949 A1 | 9/2005 | Kojima |
| 2005/0197890 A1 | 9/2005 | Lu et al. |
| 2005/0202871 A1 | 9/2005 | Lippincott |
| 2005/0204337 A1 | 9/2005 | Diesel et al. |
| 2005/0262428 A1 | 11/2005 | Little et al. |
| 2005/0272517 A1 | 12/2005 | Funk et al. |
| 2005/0282141 A1 | 12/2005 | Falash et al. |
| 2006/0047530 A1 | 3/2006 | So et al. |
| 2006/0047750 A1* | 3/2006 | Schmitt .................. H04N 7/152 709/204 |
| 2006/0077255 A1* | 4/2006 | Cheng .................. G06K 9/0063 348/143 |
| 2006/0206332 A1 | 9/2006 | Paek et al. |
| 2006/0230102 A1 | 10/2006 | Hidary |
| 2006/0235843 A1 | 10/2006 | Musgrove et al. |
| 2006/0246973 A1 | 11/2006 | Thomas et al. |
| 2006/0271872 A1 | 11/2006 | Shirai |
| 2007/0061179 A1 | 3/2007 | Henderson et al. |
| 2007/0112710 A1 | 5/2007 | Drane et al. |
| 2007/0135225 A1 | 6/2007 | Nieminen et al. |
| 2007/0192103 A1* | 8/2007 | Sato et al. .................. 704/253 |
| 2007/0196798 A1 | 8/2007 | Pryor et al. |
| 2007/0203720 A1 | 8/2007 | Singh et al. |
| 2007/0203991 A1 | 8/2007 | Fisher et al. |
| 2007/0213126 A1 | 9/2007 | Deutsch et al. |
| 2007/0259324 A1 | 11/2007 | Frank |
| 2007/0260421 A1 | 11/2007 | Berner et al. |
| 2007/0265089 A1 | 11/2007 | Robarts et al. |
| 2007/0299981 A1* | 12/2007 | Baird .................. G06Q 10/10 709/231 |
| 2008/0027891 A1 | 1/2008 | Repasi et al. |
| 2008/0049947 A1* | 2/2008 | Yoneda .................. H04R 3/02 381/73.1 |
| 2008/0052283 A1 | 2/2008 | Jensen et al. |
| 2008/0097781 A1 | 4/2008 | Clarke et al. |
| 2008/0191864 A1 | 8/2008 | Wolfson |
| 2008/0208910 A1 | 8/2008 | MacIntyre et al. |
| 2008/0275744 A1 | 11/2008 | MacIntyre et al. |
| 2008/0281620 A1 | 11/2008 | Schalk et al. |
| 2008/0288306 A1 | 11/2008 | MacIntyre et al. |
| 2008/0288889 A1 | 11/2008 | Hunt et al. |
| 2008/0300930 A1 | 12/2008 | Compitello et al. |
| 2008/0319829 A1 | 12/2008 | Hunt et al. |
| 2009/0006156 A1 | 1/2009 | Hunt et al. |
| 2009/0006164 A1 | 1/2009 | Kaiser et al. |
| 2009/0018996 A1 | 1/2009 | Hunt et al. |
| 2009/0024554 A1 | 1/2009 | Murdock et al. |
| 2009/0024747 A1 | 1/2009 | Moses et al. |
| 2009/0035736 A1 | 2/2009 | Wolpert et al. |
| 2009/0144075 A1* | 6/2009 | Flinn .................. G06N 5/048 705/318 |
| 2009/0187446 A1 | 7/2009 | Dewar |
| 2009/0198488 A1 | 8/2009 | Vigen |
| 2009/0248399 A1 | 10/2009 | Au |
| 2009/0282104 A1 | 11/2009 | O'Sullivan et al. |
| 2009/0287672 A1 | 11/2009 | Chakrabarti et al. |
| 2009/0292541 A1 | 11/2009 | Daya et al. |
| 2009/0307345 A1* | 12/2009 | Carter et al. .................. 709/224 |
| 2009/0319508 A1 | 12/2009 | Yih et al. |
| 2009/0327208 A1 | 12/2009 | Bittner et al. |
| 2010/0023377 A1 | 1/2010 | Sheridan |
| 2010/0098289 A1 | 4/2010 | Tognoli et al. |
| 2010/0100496 A1 | 4/2010 | Baldwin et al. |
| 2010/0131418 A1 | 5/2010 | McCagg et al. |
| 2010/0145678 A1 | 6/2010 | Csomai et al. |
| 2010/0153288 A1 | 6/2010 | Digiambattista et al. |
| 2010/0174813 A1 | 7/2010 | Hildreth et al. |
| 2010/0179845 A1 | 7/2010 | Davidson |
| 2010/0179916 A1 | 7/2010 | Johns et al. |
| 2010/0228558 A1* | 9/2010 | Corcoran et al. .............. 705/1.1 |
| 2010/0228733 A1 | 9/2010 | Harrison et al. |
| 2010/0274636 A1 | 10/2010 | Sheridan |
| 2010/0306251 A1 | 12/2010 | Snell |
| 2011/0040837 A1 | 2/2011 | Eden et al. |
| 2011/0055098 A1 | 3/2011 | Stewart |
| 2011/0184939 A1 | 7/2011 | Elliott |
| 2011/0208511 A1 | 8/2011 | Sikstrom et al. |
| 2011/0258049 A1 | 10/2011 | Ramer et al. |
| 2011/0282769 A1* | 11/2011 | McNulty ................. G06Q 30/02 705/30 |
| 2011/0295759 A1 | 12/2011 | Selvakummar et al. |
| 2012/0042280 A1* | 2/2012 | Hoffman ........... G06F 17/30867 715/800 |
| 2012/0117019 A1* | 5/2012 | Wolf et al. ..................... 706/52 |
| 2012/0215771 A1* | 8/2012 | Steiner ......................... 707/723 |
| 2013/0095857 A1* | 4/2013 | Garcia .................... H04W 4/02 455/456.3 |
| 2013/0122934 A1* | 5/2013 | Branch et al. ............. 455/456.3 |
| 2013/0185058 A1* | 7/2013 | Rehani et al. ..................... 704/9 |

FOREIGN PATENT DOCUMENTS

| | | |
|---|---|---|
| JP | 2004157931 | 6/2004 |
| JP | 2006061632 | 3/2006 |
| JP | 2007249322 | 9/2007 |
| WO | 2004055614 | 7/2004 |
| WO | 2008148819 | 12/2008 |
| WO | 2012000013 | 1/2012 |

OTHER PUBLICATIONS

Schaufell, Wilmar B. et al. "The Measure of Work Engagement with a Short Questionnaire." A Cross-National Study. Educational and Psychological Measurement. vol. 66, No. 4. Aug. 2006.

Performance Optimization Framework Value Proposition. Introduction and Overview. Knowledge Advisors. Copyright 2009.

Kular, S. et al., Employee Engagement: A Literature Review. Kingston University, Kingston Business School. Working Paper Series No. 19. Oct. 4, 2008.

Richards, David. Hellmann HR Team Instills Values and Behaviors. Strategic HR Review, 2008, 7, 4.

Parks, Louise et al. "A Test of the Importance of Work-Life Balance for Employee Engagement and Intention to Stay in Organisations." Journal of 6 Management and Organization. vol. 14, Issue 3, Jul. 2008.

McBain, R. "The Practice of Engagement." Strategic HR Review. Sep./Oct. 2007; 6; 6.

Hyuna, Choi. "Managing Talent Thourgh Employee Engagement." SERI Quarterly. Jul. 2008.

Lingway Vertical Search Solutions, Lingway HR Suite, "Lingway e-Recruitment Applications: a Semantic Solution for Recruitment", retrieved from http://www.lingway.com/images/pdf/fichelhrslea07anglaisweb.pdf on Jun. 17, 2012 (2 pages).

Tseng, "Semantic Classification of Chinese unknown words", ACL '03 Proceedings of the 41st Annual Meeting on Association for Computational Linguistics—vol. 2 Association for Computational Linguistics Stroudsburg, PA, USA © 2003.

Mohammad, "Measuring Semantic Distance Using Distributional Profiles of Concepts", a thesis submitted in conformity with the requirements for the degree of Graduate Department of Computer Science University of Toronto, 2008, pp. 1-167.

Mohammad, et al., "Measuring Semantic Distance Using Distributional Profiles of Concepts", Association for Computational Linguistics; retrieved at http://www.umiacs.umd.edu/~saif/WebDocs/Measuring-Semantic-Distance.pdf, 2006, pp. 1-34.

(56) References Cited

OTHER PUBLICATIONS

Office Action dated May 5, 2009, U.S. Appl. No. 11/419,324, filed May 19, 2006 entitled "System and Method for Authoring and Learning".

Van Rijk, R et al., Using CrisisKit and MOPED to Improve Emergency Management Team Training, Proceedings ISCRAM 2004, Brussels, May 3-4, 2004. pp. 161-166.

Thomas, P.G. et al., AESOP—An Electronic Student Observatory Project, Frontiers in Education, 1998, 5 pages.

Loftin, R.B. et al., Training the Hubble Space Telescope Flight Team, IEEE Computer Graphics and Applications, 1995, pp. 31-37.

Office Action dated Jun. 16, 2008, U.S. Appl. No. 11/419,317, filed May 19, 2006 entitled "Method for Interactive Training and Learning."

Office Action dated Oct. 31, 2008, U.S. Appl. No. 11/419,317, filed May 19, 2006 entitled "Method for Interactive Training and Learning."

Office Action dated Jun. 16, 2009 U.S. Appl. No. 11/419,317, filed May 19, 2006 entitled "Method for Interactive Training and Learning."

Office Action dated Nov. 17, 2009 U.S. Appl. No. 11/419,317, filed May 19, 2006 entitled "Method for Interactive Training and Learning."

Aiolli, Fabio; Sebastiani, Fabrizio; Sperduti, Alessandro, Preference learning for Category-Ranking Based Interactive Text Cagegorization, Proceedings of International Joint Conference on Neural Networks, ICJNN 2007, Orlando, FL, Aug. 12-17, 2007. pp. 2034-2039.

Mood Indicator Based on History of Electronic Communication Thread, IPCOM, Disclosure No. IPCOM000198194D, Jul. 29, 2010, 3 pages, retrieved from http://ip.com/IPCOM/000198194.

Keh, Huan-Chao, The Chinese Text Categorization System with Category Priorities, Journal of Software, Oct. 2010, vol. 5, No. 10, pp. 1137-1143.

R. Hawkins and M. Russell, Document Categorization Using Lexical Analysis and Fuzzy Sets, IBM Technical Disclosure Bulletin, Jun. 1992, vol. 35, No. 1A, 1 pg.

Moon, K. et al., "Emotional States Recognition of Text Data Using Hidden Markov Models." Proceedings of 2001 Autumn KISS. 2001. vol. 28, No. 2, pp. 127-129.

International Search Report from PCT/US2013/022072, published as WO2013109836 on Jul. 25, 2013, 3 pages.

International Search Report from PCT/US2012/036330, published as WO2012158357 on Nov. 22, 2012, 3 pages.

International Search Report from PCT/US2011/058444, published as WO 2012061254 on May 10, 2012, 3 pages.

International Search report from PCT/US2011/058435, published as WO2012061252 on May 10, 2012, 8 pages.

\* cited by examiner

REAL-TIME AUTONOMOUS ORGANIZATION

RELATED APPLICATION DATA

This application claims the benefit of U.S. Provisional Patent Application Ser. No. 61/590,202, titled "REAL-TIME AUTONOMOUS ORGANIZATION", filed Jan. 24, 2012, which is herein incorporated by reference for all purposes.

FIELD

This invention pertains to networks, and more particularly to determining networks of persons, groups, or contexts pertinent to a setting.

BACKGROUND

Humans are connected one to another through human networks. Modern day computer technologies have enabled such networks to be more extensive, grander, and more complex than at any other time in human history. Understanding the different connections within a given context is challenging using conventional technology. One typical approach, particularly in the realm of hiring and job descriptions, is to discover and analyze predetermined alliances. Another approach is to analyze email exchange patterns and history so that existent alliances can be determined.

The conventional approaches, however, are limited in scope and do not address the broader challenge of categorizing human relationships into categories that are relevant to a particular context, nor do the typical approaches include the ability to effectively visualize and comprehend the network and associated connectors.

A need remains for a way to address these and other problems associated with the prior art.

DETAILED DESCRIPTION

Embodiments of the invention include methods and systems for using measurements of invested interest in any communication among humans to categorize the communication and the associated human relationships into categories relevant to a particular context.

Embodiments of the invention enable any organization to use general and/or specific text from any type of communication to identify a human network that is relevant to a given context. Such identification can be performed, including the associated processing, analysis, and reporting, in real-time. The types of communication can include, for example, e-mails, text messages, comments, posts, tweets, transcribed conversations, and the like.

Embodiments of the invention reduce the time and ambiguity in matching and/or aligning the right people within a human network. For example, the challenge or inability of a person to connect with another person to satisfy a purpose (e.g., including purposes related to business, legal, governmental, personal, or the like) can be overcome using the inventive concepts disclosed herein.

Embodiments of the invention automatically identify facts about the people involved in a particular context. After being identified, the facts can be used to determine qualities of the connection. The qualities of the connection can help categorize which of the connections are relevant, responsive, critical, attached, among other relevant categories.

Embodiments of the invention are not limited to hiring and job descriptions, but are applicable to a broad array of human communications and networks.

Figure 1:
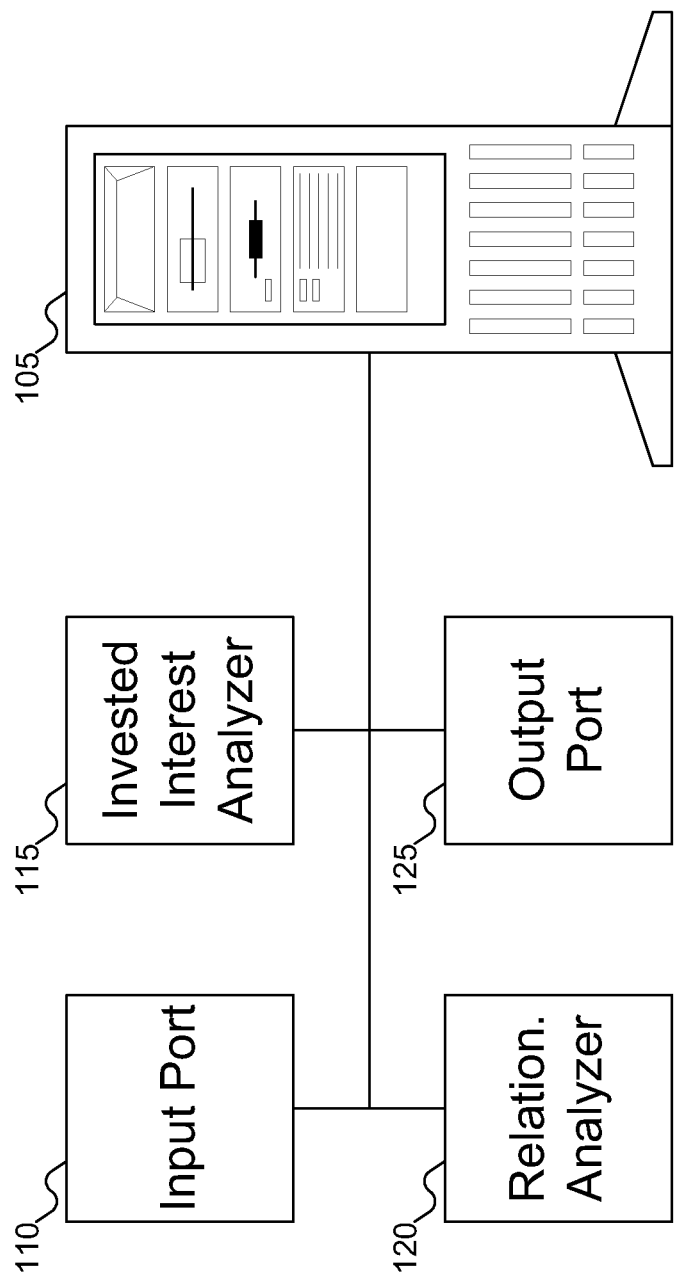
FIG. 1 shows a system for determining networks, according to an embodiment of the invention.

FIG. 1 shows a system that can be used to construct a network using content, according to an embodiment of the invention. The network can include any number of objects, and can be appropriate to a particular setting. Both the objects and the setting can be pertinent to individuals, groups, or context. Thus, for example, the network can be a human network, representing how various individuals approach a particular project. For this reason, the members of the network are referred to as "objects", and the purpose of the network is referred to as the "setting".

In FIG. 1, server 105 is shown as including input port 110, invested interest analyzer 115, relationship analyzer 120, and output port 125. Input port 110 is used to receive content to be analyzed. The content to be analyzed can be, for example, documents, e-mails, texts, comments, posts, tweets, and transcribed conversations, or it can be streamed content (where the tokens in the content are received over time and not all immediately identifiable). A single piece of content can relate to one or more objects in the network, one or more relationships in the network, or both. Invested interest analyzer 115 can analyze the content to determine the invested interest of objects in the setting. Relationship analyzer 120 can analyze the content to determine the relationships between the various objects in the network. Output port 125 can output information regarding the network. Although depicted as a server, server 105 can be replaced by any suitable machine, including, for example, a personal computer, workstation, server, portable computer, handheld device, telephone, tablet, etc.

While FIG. 1 shows invested interest analyzer 115 and relationship analyzer 120 as separate components of the system, a person skilled in the art will recognize that a singer analyzer can perform both operations as part of the analysis of the content. Thus, separate analyzers, while they can be used, are not necessary.

Figure 2:
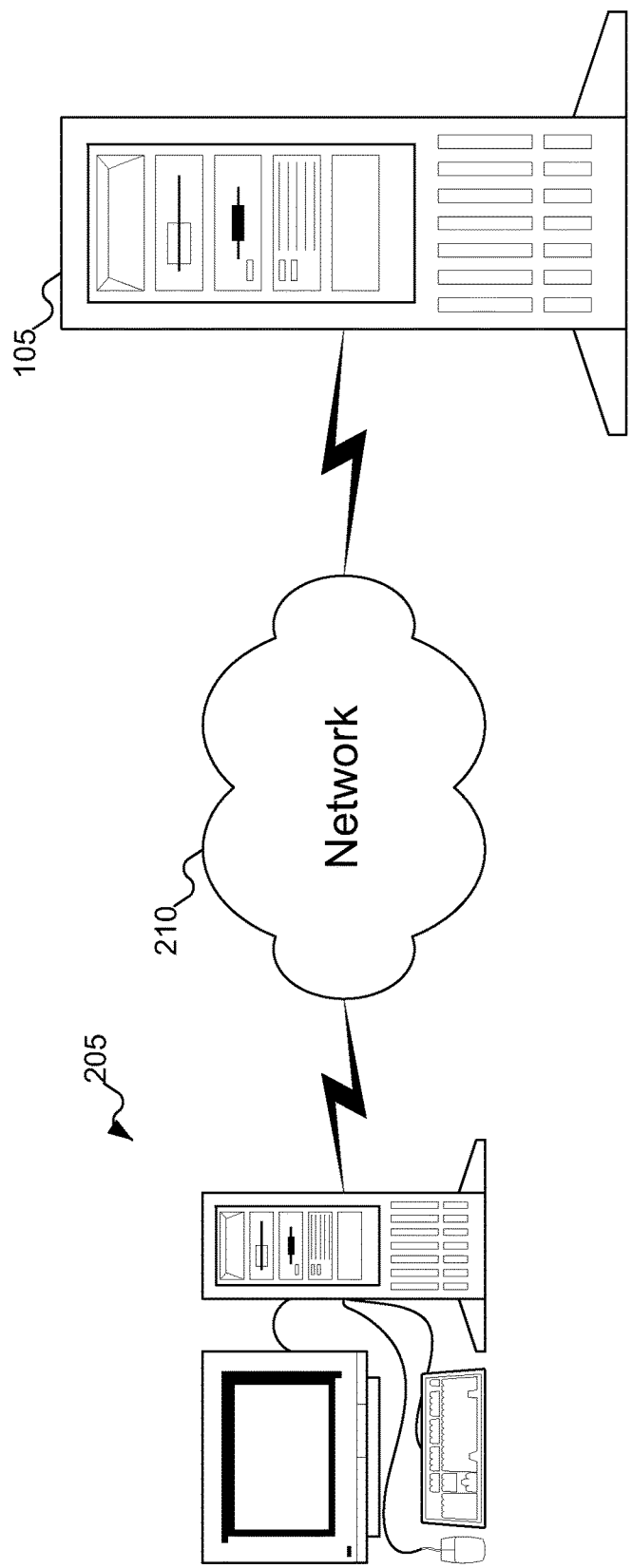
FIG. 2 shows a client computer connected to the system of FIG. 1 via a network.

FIG. 2 shows a client computer connected to the system of FIG. 1 via a network. In FIG. 2, client computer 205 is connected to server 105 via network 210. Client computer 205 can be any desired machine, such as a personal computer, workstation, server, portable computer, handheld device, telephone, tablet, etc.

Figure 3:
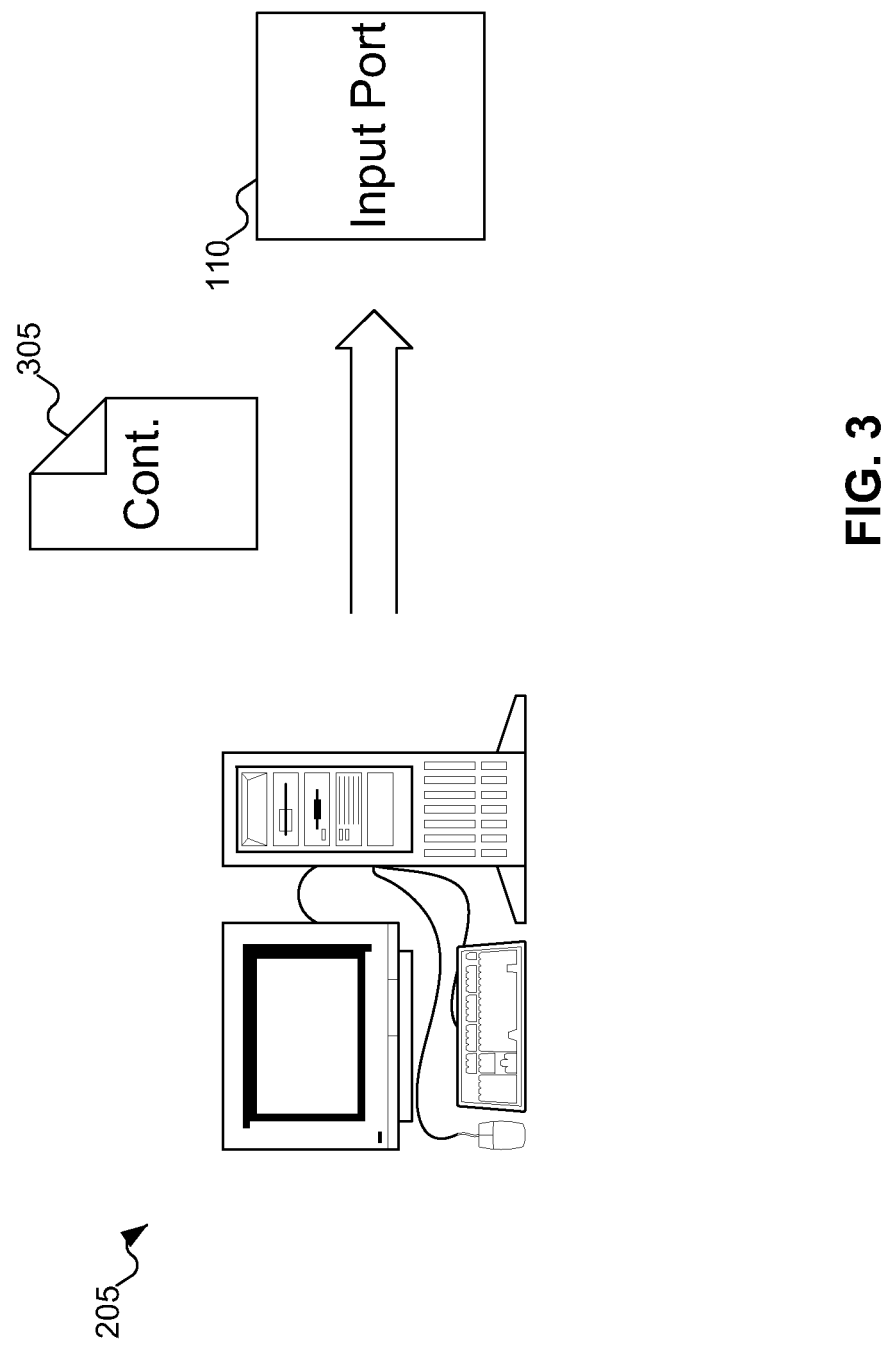
FIG. 3 shows content being input to the system of FIG. 1.

FIG. 3 shows client computer 205 providing content 305 to input port 110 of the server of FIG. 1. While FIG. 3 shows content 305 coming from client computer 205, a person of ordinary skill in the art will recognize that content 305 can come from any source, including, for example, the server itself, other computers on the local area network including the server, or by scanning content from the Internet, among other possibilities.

Figure 4:
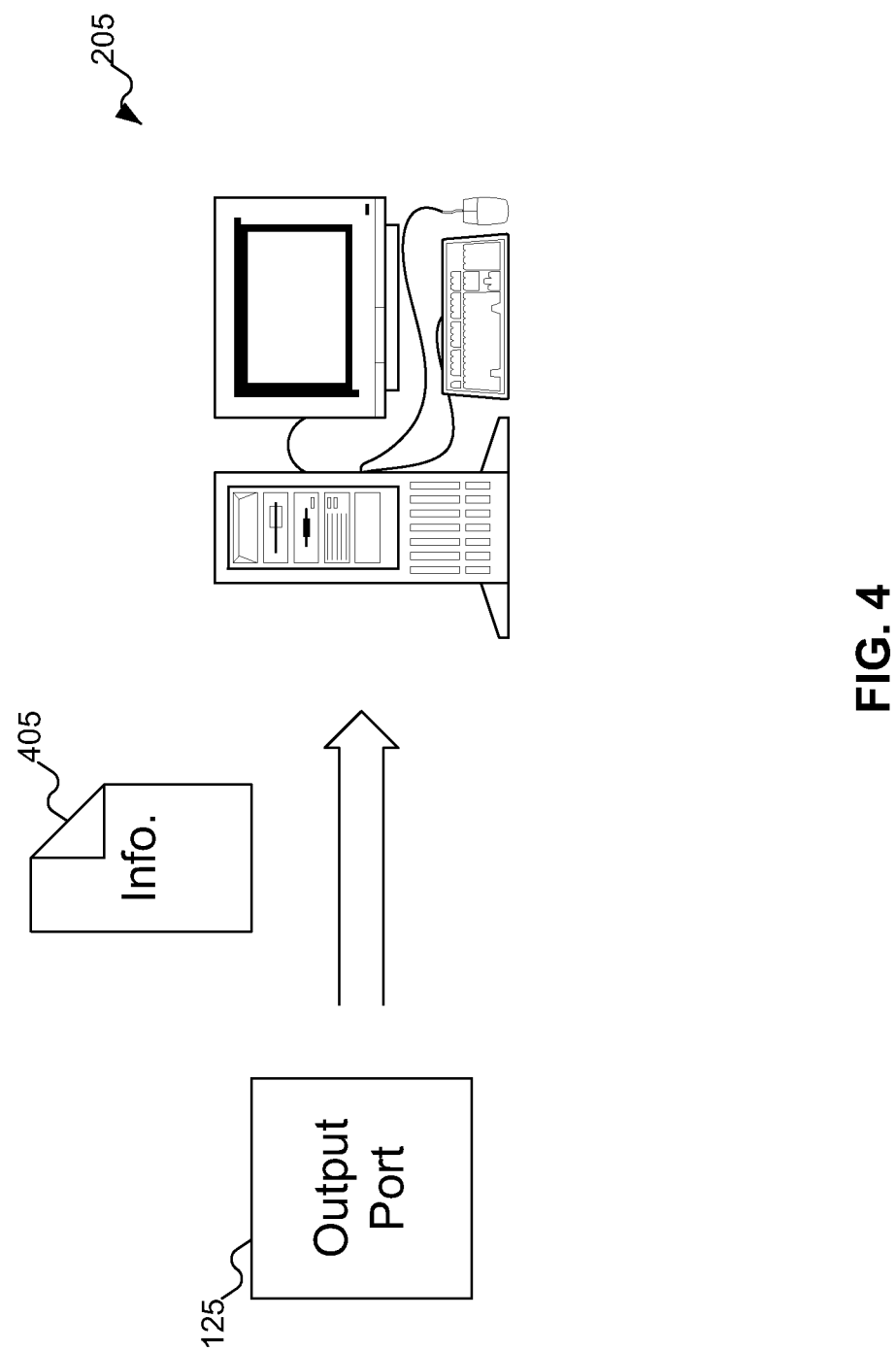
FIG. 4 shows information being output from the system of FIG. 1.

FIG. 4 shows client computer 205 receiving information from output port 125 of the server of FIG. 1. Client computer 205 can be a data consumer, and can represent one or more computers or one or more individual persons that can receive information from the server over the network. Such received information can include one or more statements or reports 405, otherwise referred to just as "information", which can include one or more diagrams of a human network and related analysis as described in detail above. Information 405 can correspond to, for example, a physical paper or electronic report. Information 405 can be produced using any of the methods described above.

It will be understood that information 405 can include an electronic statement or report that is storable in a storage medium such as a hard disk drive, memory, or other suitable storage device. Alternatively, information 405 can include a physical statement or report such as a paper printout, which may be derived from the electronic statement or report. Information 405 and associated processing for generating information 405 can be provided or otherwise implemented via a web browser toolbar, client user interface, software as a service (SAS) interface, or the like.

Figure 5:
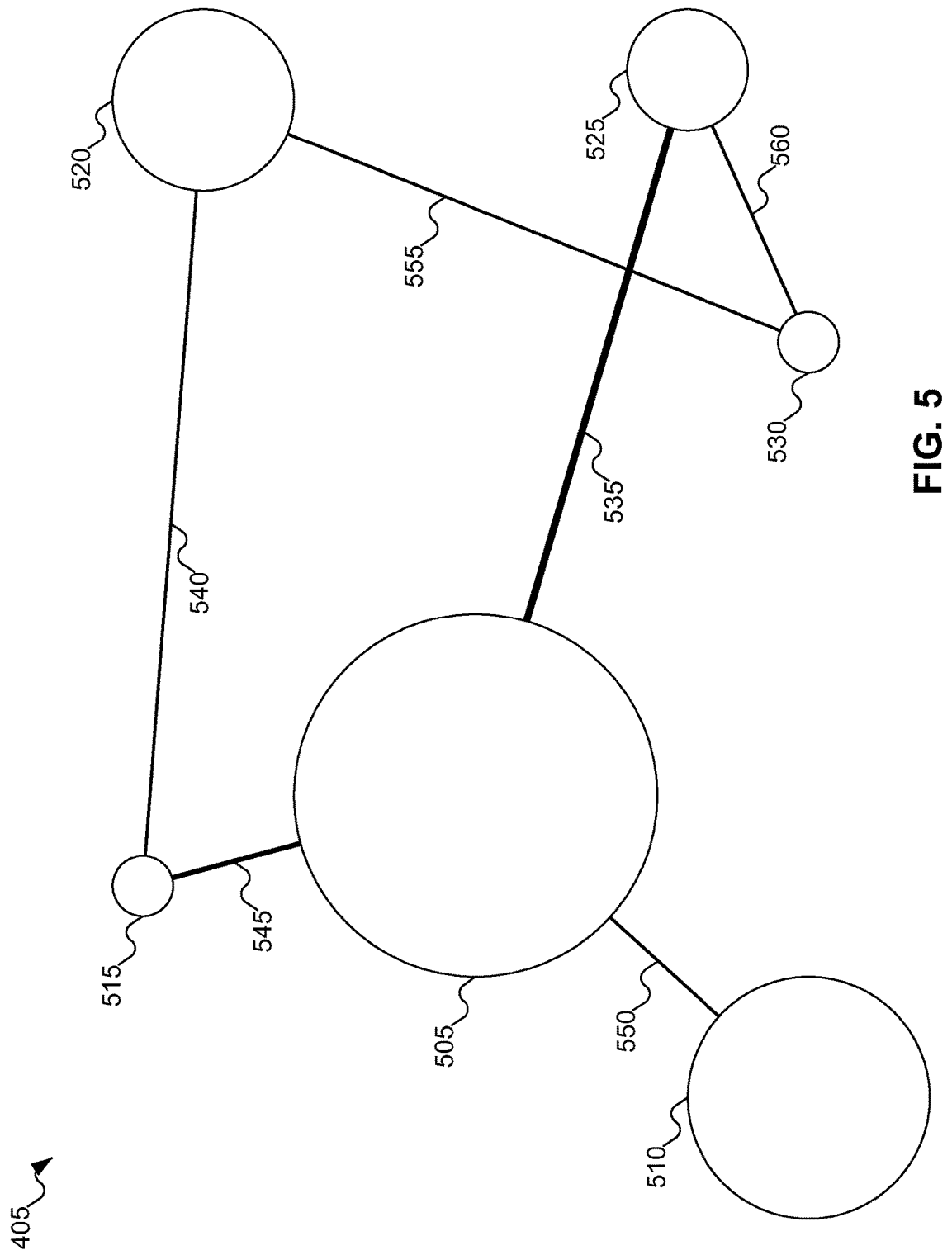
FIG. 5 shows an example of a network as determined by the system of FIG. 1.

FIG. 5 shows a network representing different values of particular categories of invested interest relative to persons and connections between persons, according to yet another example embodiment of the present invention. Each node, such as nodes 505, 510, 515, 520, 525, and 530, represents a person involved in a particular context. It will be understood that other suitable shapes can be used to represent each person. The size of the node corresponds to the value of a particular category of invested interest of the person, relative to other persons in the network. For example, node 505 is larger relative to nodes 510, 515, 520, 525, and 530, and therefore the human being represented by node 505 has a higher value of invested interest in the particular category.

The connectors and/or lines, also called "edges", between the nodes indicate connections, or relationships, between the individuals represented by the nodes. The thickness of each edge corresponds to the value of the particular category of invested interest of the connection. For example, edge 535 is thicker than edges 540, 545, 550, 555, and 560, and therefore, edge 535 indicates a higher value of the particular category of invested interest of the relationship.

Such a diagram captures information about people within a human network and connections between the people, and presents such information in an intuitive format, which can be quickly and easily understood by others. The diagram can be included in a report about the human network for further analysis or consideration. In some embodiments, the diagram is a three dimensional representation of a complex human network, and its associated connectors, displayed in a perceptive format and/or report. In some embodiments, the diagram can be embodied in a semantic space and comprise four or more dimensions.

Figure 6:
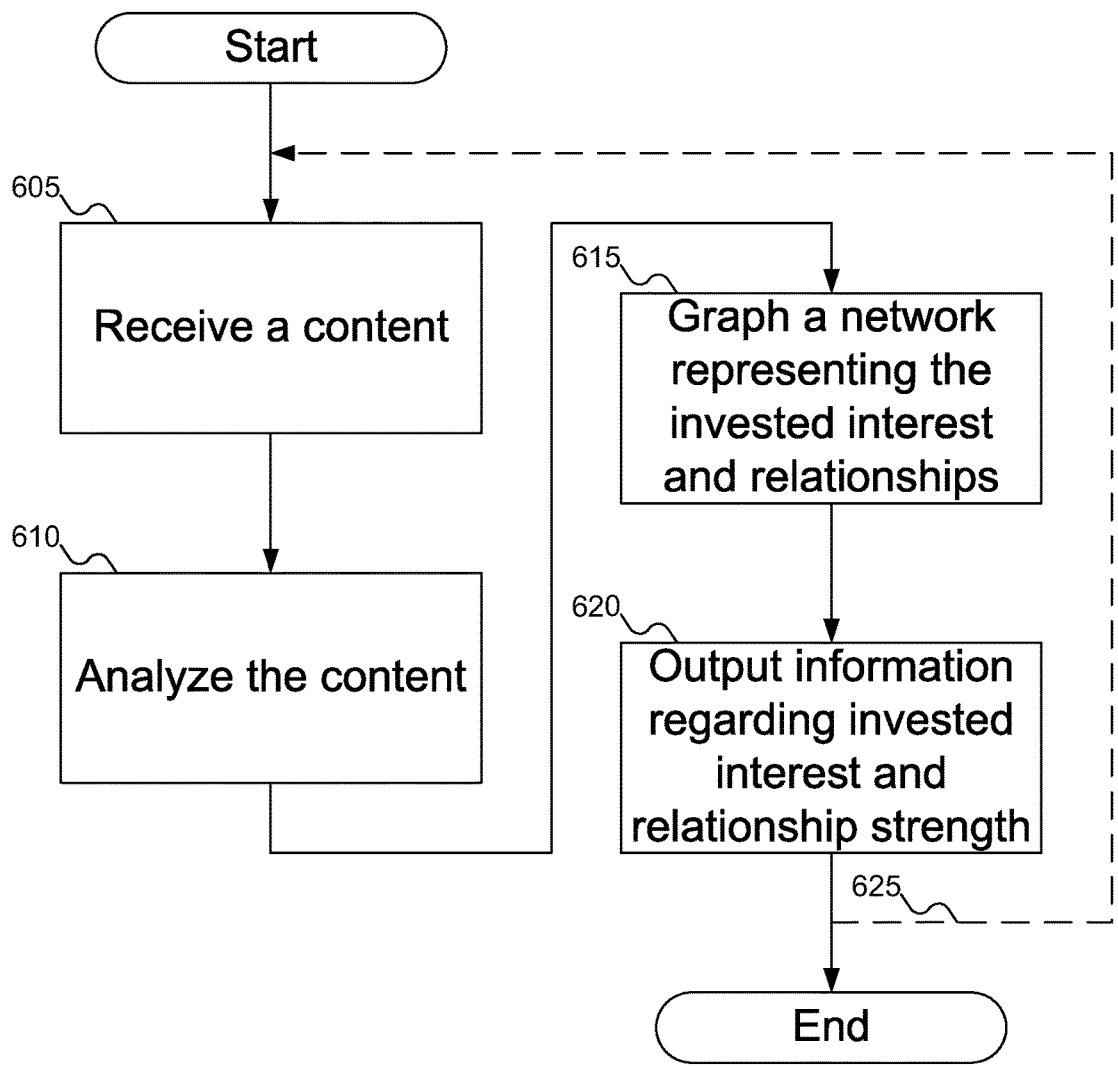
FIG. 6 shows a flowchart of a procedure for constructing a network using the system of FIG. 1, according to an embodiment of the invention.

FIG. 6 shows a flowchart of a procedure for using the server of FIG. 1 to generate information, such as the network shown in FIG. 5. In FIG. 6, at block 605, the system receives content. As discussed above, the content can be obtained from publicly available information, network hubs, and the like, or from private networks such as private business local area networks (LANs), email systems, servers, and the like. At block 610, the system analyzes the content to determine the invested interest of objects in the network and the relationships between the objects. At block 615, the system can graph the information to produce a network of objects relative to a particular setting. At block 620, the system can output the information as determined by the system.

The above description might be read as suggesting that content is analyzed once, after which the network is graphed and the system is done. But as more content become available, the determined invested interest of the objects, or the relationships between the objects, might change. Thus, as shown by dashed line 625, the procedure can return to block 605 to receive additional content for analysis, which can alter the network of objects.

Figure 7:
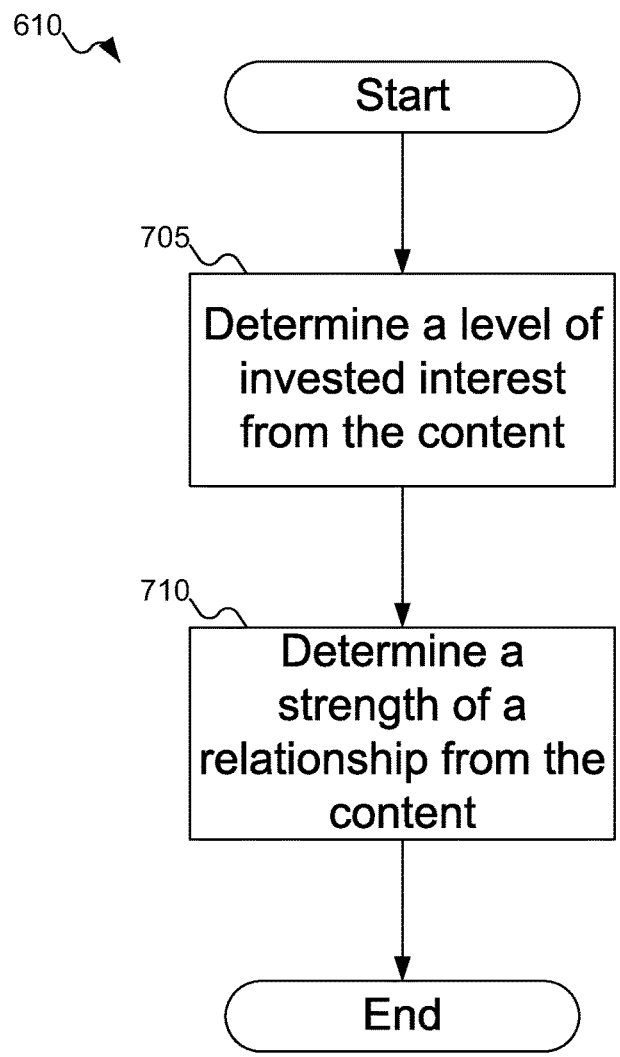
FIG. 7 shows details of how content is analyzed in FIG. 6.

FIG. 7 shows details of how content is analyzed in FIG. 6. In FIG. 7, at block 705, the system analyzes content to determine the level of invested interest of an object from the content. At block 710, the system, analyzes content to determine the strength of a relationship from the content.

A person of ordinary skill in the art will recognize that the order of blocks 705 and 710 is not limited to that shown in FIG. 7. Thus, it is possible for the system to determine the strength of a relationship before determining the level of invested interest of an object. Or, the two analyses can be performed at the same time (and even as part of the same analysis of the content).

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers (105), portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 810.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other non-transitory storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
a server;
an input port on the server to receive a content regarding at least one of a plurality of objects;
an invested interest analyzer to analyze said content to identify a level of invested interest for each of said objects in a setting;
a relationship analyzer to analyze said content to identify a strength of a relationship for each pair of the objects in said setting; and
an output port on the server to output information regarding said level of invested interest for each of said objects in said setting and said strength of said relationship for each pair of said objects,
wherein the output port is operative to output a network including at least two nodes and at least one edge, wherein each node in said network corresponds to one of said objects, each edge between pairs of nodes represents a relationship between said pair of objects represented by said nodes, a size of said node represents said invested interest of said corresponding object, and a thickness of said edge between pairs of nodes represents said strength of said relationship between said pair of objects represented by said nodes.

2. A system according to claim 1, wherein the plurality of objects is drawn from a set including individuals, groups, and contexts.

3. A system according to claim 1, wherein the setting is drawn from a set including an individual, a group, or a context.

4. A system according to claim 1, wherein:
the input port is operative to receive a new content regarding at least one of said objects;
the invested interest analyzer is operative to analyze said new content to identify a new level of invested interest for each of said objects in said setting;
the relationship analyzer is operative to analyze said new content to identify a new strength of a relationship for each pair of the objects in said setting; and
the output port is operative to output new information regarding said level of invested interest for each of said objects in said setting and said strength of said relationship for each pair of said objects.

5. A system according to claim 1, wherein said content is drawn from a set including documents, e-mails, texts, comments, posts, tweets, and transcribed conversations.

6. A method, comprising:
receiving a content regarding at least one of a plurality of objects;
analyzing the content using a machine to identify a level of invested interest for each of the objects in a setting and to identify a strength of a relationship for each pair of the objects in the setting; and
outputting information regarding the level of invested interest for each of the objects in the setting and the strength of the relationship for each pair of the objects, including graphing a network, wherein the network includes at least two nodes and at least one edge, each node in the network corresponds to one of the objects, each edge between pairs of nodes represents a relationship between the pair of objects represented by the nodes, a size of the node represents the invested interest of the corresponding object, and a thickness of the edge between pairs of nodes represents the strength of the relationship between the pair of objects represented by the nodes.

7. A method according to claim 6, wherein receiving a content includes receiving the content regarding the at least one of the plurality of objects, the plurality of objects drawn from a set including individuals, groups, and contexts.

8. A method according to claim 6, wherein analyzing the content includes analyzing the content to identify the level of invested interest for each of the objects in the setting and to identify the strength of the relationship for each pair of the objects, the setting drawn from a set including an individual, a group, or a context.

9. A method according to claim 6, further comprising:
receiving a second content regarding at least one of a plurality of objects;
analyzing the new content using a machine to identify a new level of invested interest for each of the objects in the setting and to identify a new strength of the relationship for each pair of the objects in the setting; and
outputting new information regarding the new level of invested interest for each of the objects in the setting and the new strength of the relationship for each pair of the objects.

10. A method according to claim 6, wherein receiving a content includes receiving the content regarding at least one of the objects, the content drawn from a set including documents, e-mails, texts, comments, posts, tweets, and transcribed conversations.

11. An article, comprising a non-transitory storage medium, said non-transitory storage medium having stored thereon instructions that, when executed by a machine, result in:
receiving a content regarding at least one of a plurality of objects;
analyzing the content using a machine to identify a level of invested interest for each of the objects in a setting and to identify a strength of a relationship for each pair of the objects in the setting; and outputting information regarding the level of invested interest for each of the objects in the setting and the strength of the relationship for each pair of the objects, including graphing a network, wherein the network includes at least two nodes and at least one edge, each node in the network corresponds to one of the objects, each edge between pairs of nodes represents a relationship between the pair of objects represented by the nodes, a size of the node represents the invested interest of the corresponding object, and a thickness of the edge between pairs of nodes represents the strength of the relationship between the pair of objects represented by the nodes.

12. An article according to claim 11, wherein receiving a content includes receiving the content regarding the at least one of the plurality of objects, the plurality of objects drawn from a set including individuals, groups, and contexts.

13. An article according to claim 11, wherein analyzing the content includes analyzing the content to identify the level of invested interest for each of the objects in the setting and to identify the strength of the relationship for each pair of the objects, the setting drawn from a set including an individual, a group, or a context.

14. An article according to claim 11, said non-transitory storage medium having stored thereon further instructions that, when executed by a machine, result in:
   receiving a second content regarding at least one of a plurality of objects;
   analyzing the new content using a machine to identify a new level of invested interest for each of the objects in the setting and to identify a new strength of the relationship for each pair of the objects in the setting; and
   outputting new information regarding the new level of invested interest for each of the objects in the setting and the new strength of the relationship for each pair of the objects.

15. An article according to claim 11, wherein receiving a content includes receiving the content regarding at least one of the objects, the content drawn from a set including documents, e-mails, texts, comments, posts, tweets, and transcribed conversations.

* * * * *